(12) United States Patent
Smith et al.

(10) Patent No.: US 8,018,699 B2
(45) Date of Patent: Sep. 13, 2011

(54) OVER VOLTAGE PROTECTION FOR REDUCED LEVEL ELECTRICAL SIGNAL INTERFACES

(75) Inventors: Paul D Smith, Dunlap, IL (US); Matthew Lee Boggs, Metamora, IL (US); Charles Komsri, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 304 days.

(21) Appl. No.: 11/925,218

(22) Filed: Oct. 26, 2007

(65) Prior Publication Data
US 2009/0109587 A1 Apr. 30, 2009

(51) Int. Cl.
*H02H 3/20* (2006.01)
(52) U.S. Cl. ........................ 361/91.1; 361/111
(58) Field of Classification Search .................. 361/91.1, 361/111
See application file for complete search history.

(56) References Cited

U.S. PATENT DOCUMENTS

| | | | |
|---|---|---|---|
| 3,241,029 A * | 3/1966 | Slomski | 320/153 |
| 5,625,272 A | 4/1997 | Takahashi | |
| 5,793,189 A | 8/1998 | Kawaguchi | |
| 5,936,317 A | 8/1999 | Sasanouchi et al. | |
| 5,977,751 A | 11/1999 | Blessing et al. | |
| 5,991,140 A * | 11/1999 | Hughes et al. | 361/119 |
| 6,020,717 A | 2/2000 | Kadouchi et al. | |
| 6,211,649 B1 | 4/2001 | Matsuda | |
| 6,249,106 B1 | 6/2001 | Turner et al. | |
| 6,320,351 B1 | 11/2001 | Ng et al. | |
| 6,351,360 B1 | 2/2002 | Kotowski et al. | |
| 6,747,860 B2 | 6/2004 | Braiman | |
| 6,788,506 B1 | 9/2004 | Stockstad | |
| 6,946,904 B1 * | 9/2005 | Varma et al. | 327/595 |
| 6,948,078 B2 | 9/2005 | Odaohhara | |
| 2002/0005738 A1 * | 1/2002 | Inn | 327/51 |
| 2002/0057795 A1 * | 5/2002 | Spurgat et al. | 380/1 |
| 2004/0082222 A1 * | 4/2004 | Okamura | 439/610 |
| 2007/0230077 A1 * | 10/2007 | Kim | 361/91.1 |
| 2008/0316660 A1 * | 12/2008 | Huang et al. | 361/56 |

OTHER PUBLICATIONS

Paul Horowitz, The Art of Electronics, 2006, The Press Syndicate of the University of Cambridge, Second Edition, 165-166.*

* cited by examiner

*Primary Examiner* — Rexford N Barnie
*Assistant Examiner* — Tien Mai
(74) *Attorney, Agent, or Firm* — Leydig, Voit & Mayer

(57) ABSTRACT

A device for protecting sensitive electronic equipment from low level signal lines short circuited to high voltage power sources includes a switch that open the circuit between the data lines and the sensitive computing equipment if a high voltage condition is detected on the data lines. Otherwise, the switch remains closed and data can be transmitted to the computing equipment.

10 Claims, 2 Drawing Sheets

OVER VOLTAGE PROTECTION FOR REDUCED LEVEL ELECTRICAL SIGNAL INTERFACES

TECHNICAL FIELD

This patent disclosure relates generally to electrical circuits and, more particularly to a long-term over-voltage protection circuit for protecting electrical components used to transmit and receive data signals routed through a machine, while providing minimal signal loss.

BACKGROUND

Machines used primarily in industrial applications, such as hydraulic excavators, bulldozers, backhoes, loaders, graders compactors and the like, have been designed with increasingly more complex control systems. The additional complexity allows the machines to perform assigned tasks more efficiently and precisely. For example, excavators can move more material within a given time period while moving material only within a defined boundary area. However, using traditional operator controls, such as joysticks and foot pedals, the efficiency and precision of machines are limited by both the controls themselves and operator proficiency.

Computing devices have been used to further improve the operation and efficiency of such machines. These computing devices may be configured to monitor and control various operating characteristics of the machines. For example, engine operation, torque transfer and work tool movement may all be electronically controlled. One of the constraints on use of computing equipment, however, is that it is required to withstand extreme operating conditions. For example, such machines are sometimes exposed to great temperature variation. Further, machines are often deployed in wet, dirty, and other adverse environments.

Often, such machines require relatively high voltage electrical power distribution among the batteries and various loads of the machine. These circuits can potentially short circuit various machine components, including circuits used in low power applications such as the computing equipment. Under these conditions, computing devices can be destroyed by prolonged short circuit conditions applied by virtue of malfunction of the machine's high voltage electrical power systems.

Various circuits have been designed to protect computing devices in traditional environments where such equipment is used, such as in office environments and the like. These circuits are typically designed for protection from transient over-voltage conditions. For example, such circuits may provide protection from electro static discharge. However, they are not designed to protect sensitive computing devices from steady state or long term over-voltage conditions, such as the application of a continuous short circuit to the main electrical power system of a machine.

Other over-voltage protection circuits have been used to protect computing equipment from continuous short circuits to high voltage power sources. For example, U.S. Pat. No. 6,788,506 to Stockstad discloses an over-voltage protection circuit that is implemented on the same integrated circuit as the computing equipment it is intended to protect. The circuit is part of an integrated circuit implementing a USB controller for an associated computer. Stockstad, however, does not allow the protection circuit to be retrofitted for use with any computing equipment and any input to the computing equipment. Further, Stockstad reduces the voltage of an over-voltage signal and transmits the reduced voltage version of the signal. For certain conditions such as a prolonged over-voltage condition, therefore, Stockstad does not adequately protect the computing equipment. Stockstad is susceptible to passing an incorrect logic value to the computing equipment. For example, if the signal had been 0.3 volts, representing a logical 0 to the computing equipment, a short circuit condition may have raised the signal to a much higher value, such as 10 volts. Stockstad then reduces this value to 3.3 volts, representing a logical 1 to the computing equipment. Therefore, the computing equipment would process incorrect data, which may cause a failure of the machine.

BRIEF SUMMARY

The present disclosure provides, in one aspect, a circuit for limiting the electrical power supplied via a low-power signal pathway, such as a serial bus, to a computing device or other sensitive electrical devices disposed on a machine. The circuit provides for both fast acting transient over-voltage protection and long term continuous over-voltage protection. The fast acting transient over voltage protection circuit senses transient voltages exceeding a threshold value and limits the electrical power transmitted from an external interface to the computing device when the threshold value is exceeded.

The signal path also passes through the long term over-voltage circuit. The long term over voltage protection circuit includes a first switch that connects the external interface to the computing device. When the switch is in the closed position, data signals are transmitted between the external interface and the computing device. A second switch is configured to sense the voltage level at the external interface. The latter switch acts as a voltage level translator to provide a control signal to open the first switch if the voltage sensed at the external interface exceeds a predetermined threshold voltage. In this way, power is removed from the low power serial bus and the computing device until the long term over voltage condition is no longer present.

DETAILED DESCRIPTION

This disclosure relates to a device for protecting sensitive computing equipment from sustained over-voltage conditions. In an embodiment, a protection circuit includes a switch that is disposed in circuit between a low power external peripheral interface, such as a USB interface, and a computing device. When the switch is in the closed position, the low power interface connects to the computing device. Hence, the computing device can receive signals from the low power interface. When the switch is in the open position, the computing device is disconnected from the low power interface and therefore does not receive signals through the interface. A second switch, configured as a voltage level translator, controls operation of the first switch by opening the same if the voltage level of the sensed signals present on the external interface circuit exceed a threshold voltage.

Figure 1:
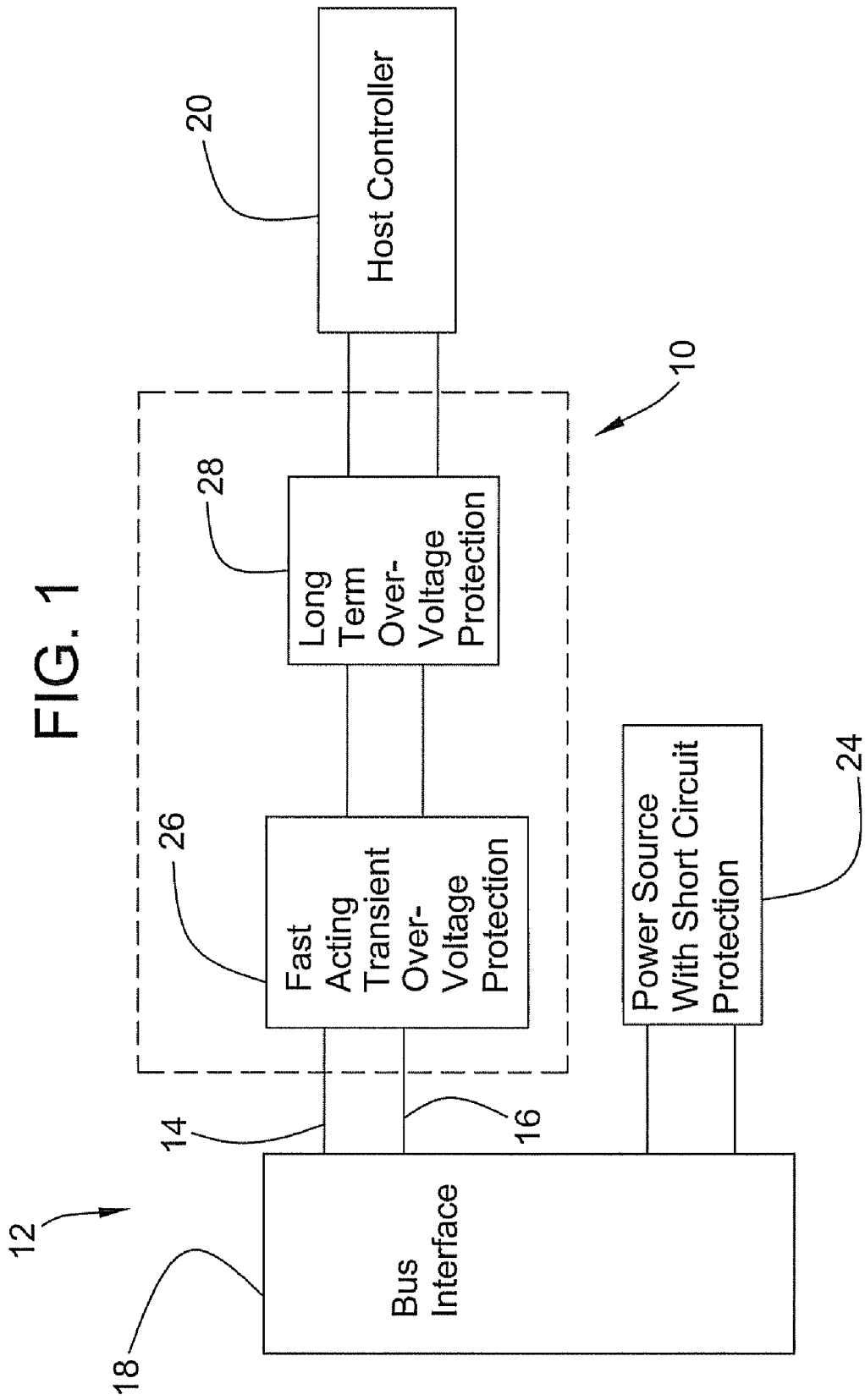
FIG. 1 is a block diagram representation of an over voltage protection circuit according to the present disclosure.

FIG. 1 illustrates a block diagram representation of an over-voltage protection circuit 10 suitable for use with one or more computing devices (not shown), such as an electronic control unit or other computing apparatus located on a machine. In one embodiment, the over-voltage protection circuit 10 protects the computing apparatus from fault signals transmitted via a low power serial bus 12, such as a Universal Serial Bus ("USB") bus, to the computing apparatus. In the illustrated embodiment, the low power serial bus 12 is shown schematically as a pair of leads 14, 16 of a USB cable that connects to the protection circuit 10 at an interface 18. The USB interface 18 can provide connectivity to a multitude of devices on the machine. For example, storage devices, camera devices, engine sensors, pressure detectors, radar detectors, other remote sensors and other communication equipment can interface to the computing device using the USB standard.

While the disclosure may be used in conjunction with various types of low power interface circuitry, a USB-compliant implementation allows peripherals to connect to a computing device using a single interface socket or interface 18. Specifically, USB-compliant systems include a host controller 20 that connects to multiple peripheral devices which are daisy-chained together. In this embodiment, the computing device contains the host controller 20. Peripheral devices such as video camera sensors and radars are disposed at desired locations on the machine as will be understood by those skilled in the art.

The USB standard requires data to be transmitted via a pair of differential data conductors. USB utilizes non-return-to-zero Inverted (NRZI) encoding to transmit data such that data lines carry either a logical "1" or a logical "0," without any encoded neutral state. A transition on the data line at a clock boundary represents a logical "1." Conversely, the absence of a transition on the data line at a clock boundary represents a logical "0." Additionally, USB devices, such as the host controller 20, include clock data recovery (CDR) circuitry (not shown) to recover the clock based on transitions on the data line. Therefore, a separate data clock is not transmitted.

In addition to the data lines, the USB standard provides a 5 volt power supply signal and a ground signal via power and ground wires (not illustrated). Using this power supply, some USB-compliant devices draw all necessary power to operate the device. Other USB devices, however, have additional power requirements and have their own power supplies in addition to the USB connection. Although the illustrated embodiment utilizes the USB standard, any low power signal can benefit from the disclosure. For example, Firewire, which is standardized as Institute of Electrical and Electronics Engineers (IEEE) 1394 Standard, provides connections to many types of devices and may be implemented in a machine. Other standards such as Ethernet or proprietary signaling schemes can also benefit from the disclosed over voltage protection scheme.

In the embodiment illustrated in FIG. 1, the USB interface 18 connects to a 5 volt, current limited power supply 24. The 5 volt current limited power supply 24 provides short circuit to battery protection for external USB devices. Therefore, if the low voltage power supply 24 short circuits to the machine power system, the short circuit protection circuit within the power supply 24 protects the power supply.

In many machine designs, low power data busses, such as USB cables, are required to be routed throughout various portions of the machine. For example, one possible configuration requires a computing device, and hence the host controller 20 shown in FIG. 1, to be located in an operator compartment of the machine. A USB cable is be routed from the operator compartment to various sensors used to obtain sensing signals to control the machine. For example, one or more camera sensors (not shown) may be disposed at the rear of the machine to provide signals that are processed as video images on a display. Such images may be associated with the computing device to assist the operator with maneuvering the machine. In order to connect the computing device to the camera sensors, a USB cable may have to be harnessed and/or routed in close proximity to a cable connected to the machine's high power system. Machines operate in a variety of extreme conditions and over rugged terrain. If the USB cable and high power cable short together, perhaps as a result of friction as the machine traverses the rugged terrain, the computing device may be destroyed. Therefore, a long term over voltage protection circuit 28 protects the computing device from short circuit conditions, such as a short circuit with a high power source. The long term over voltage protection circuit 28 is further described below with reference to FIG. 2.

In addition to the long term over voltage protection circuit 28, a fast acting, transient over voltage protection circuit 26 protects the USB host controller 20 from transient high voltage situations. For example, electrostatic discharge (ESD) can destroy sensitive computing equipment. ESD occurs from a momentary electric current flowing between two objects at varying electrical potentials. Static electricity is one common form of ESD. ESD may consist of very high voltages, in the range of tens of thousands of volts. However, the duration of ESD is typically very short. Therefore, the fast acting transient over voltage protection circuit 26 must prevent high voltages over short periods from damaging the computing equipment containing the USB host controller 20.

As illustrated in FIG. 1, the power supply 24 is independently connected to the USB interface 18. However, the long term over voltage protection circuit 28 and the fast acting transient over voltage protection circuit 26 connect to the USB interface 18 in series with the USB host controller 20. Thus, the USB host controller is protected from both long term over voltage issues and short term ESD type over voltage situations.

Figure 2:
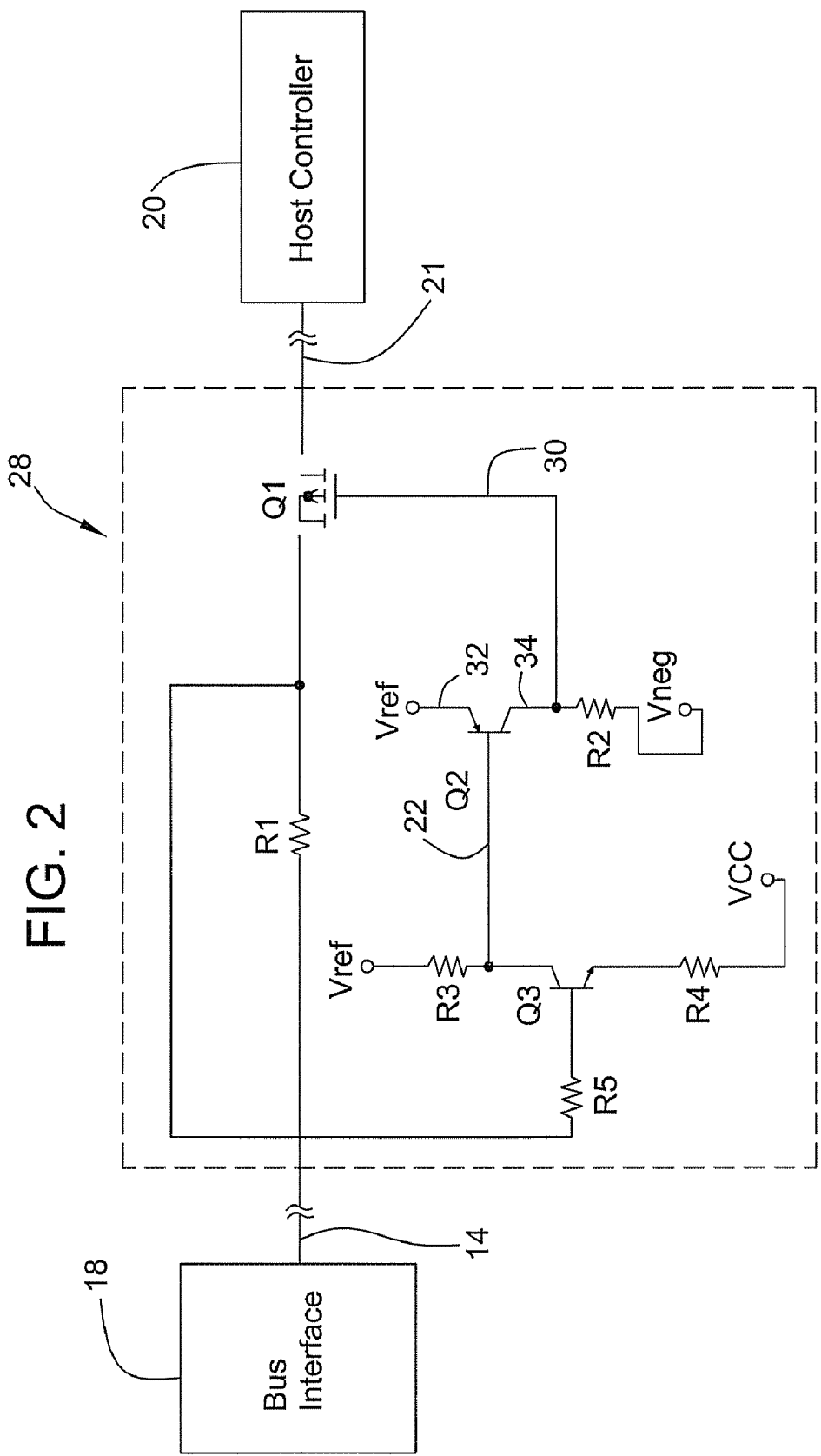
FIG. 2 is an electrical schematic of a long term over voltage protection circuit that may be employed in the circuit of FIG. 1.

FIG. 2 illustrates the long term over-voltage protection circuit 28 shown in FIG. 1 in greater detail. The long term over-voltage protection circuit 28 includes a main control switch Q1 that disconnects the USB host controller 20 from the USB interface 18 when a high voltage is present at the USB interface 18, and which is also present at the terminal of the bus as it enters leads 14 and 16. In one embodiment, the switch Q1 is implemented as a field effect transistor (FET). The source terminal of the transistor Q1 connects to the low power bus through lead 14 and through a resistor R1. The resistor R1 provides minimal protection from fast transient voltage spikes. The drain terminal of the transistor Q1 is connected to the USB host controller 20 via a line 21. Finally, the gate is connected via a line 30 to the collector of a transistor Q2, which controls the operation of the switch Q1. In the illustrated example circuit, Q2 is a PNP bipolar junction transistor (BJT).

The transistor Q2, in turn, has its base terminal connected to the collector of a further control transistor Q3 via a line 22. The latter transistor Q2 has its emitter terminal connected via a line 32 to a reference voltage, $V_{ref}$. The collector terminal of the transistor Q2 is connected via a line 34 to a pull-down resistor R2 to a reference voltage, $V_{neg}$. $V_{neg}$ is a negative voltage in relation to the source terminal of Q1 sufficient to insure that Q1 remains in a low resistance state when the voltage on lead 14 is at a logical low.

A second bipolar junction transistor Q3 controls operation of the transistor Q2 through connection to the base terminal of the transistor Q2. Specifically when controlling Q2, the collector terminal of the transistor Q3 is pulled to reference voltage $V_{ref}$ through pull up resistor R3. The emitter terminal of the transistor Q3 connects to the supply voltage $V_{CC}$ through a resistor R4. In the illustrated embodiment, the supply voltage $V_{CC}$ is 5 volts. The base terminal of the transistor Q3 connects to the USB interface 18 through resistor R5 and resistor R1. In the illustrated example circuit, Q3 is a NPN bipolar junction transistor (BJT).

In operation, the FET Q1 allows a signal to pass between the USB interface 18 and the host controller 20 when the gate terminal of the FET Q1 has a negative voltage applied to it. If the voltage applied to the gate of the FET Q1 is positive, than the FET opens and a signal will not pass from the USB interface 18 to the USB host controller 20. Therefore, in over voltage situations, the FET Q1 should open by applying a positive voltage to the FET's gate terminal.

As noted above, the main control switch Q1 is controlled by the transistor Q2. The emitter terminal of the BJT Q2 is connected via a line 32 to a reference voltage, $V_{ref}$. $V_{ref}$ is a voltage approximately equal to the maximum voltage that the circuit is intended to protect. In one embodiment, $V_{ref}$ is the same voltage as the machine's battery. The collector terminal of the transistor Q2 is connected via a line 34 to a pull-down resistor R2 to a negative reference voltage, $V_{neg}$. A second BJT transistor Q3 controls the base of the transistor Q2.

The transistor Q3 operates in a common emitter configuration. When the voltage connected to the base exceeds the base emitter forward voltage, approximately $V_{CC}$, the transistor turns on. Therefore, the NPN BJT Q3 operates as a level translator. When the input voltage from the USB interface 18 exceeds approximately $V_{CC}$, the Q3 transistor begins to conduct. Thus, Q3 translates the input voltage from the USB interface 18 to an appropriate level and forwards the appropriate signal to Q2.

The PNP transistor Q2 also operates in a common emitter configuration. When the voltage connected to the base exceeds the base emitter voltage, the transistor Q2 begins to conduct. When the PNP BJT Q2 turns on, current flows from $V_{ref}$ through the transistor Q2 and pulls the gate terminal of the FET Q1 high. This turns off the FET to thereby isolate the host controller 20 from the USB interface 18. On the other hand, when the high voltage condition detected at the USB interface 18 is removed, the voltage level at lead 14 will correspondingly be reduced. As a result, the voltage level supplied to the base terminal of the transistor Q3 is reduced. Thus, when detecting a high voltage condition at lead 14, the transistor Q3 turns off.

When the transistor Q3 no longer conducts, the output voltage supplied at the line 22 is equal to Vref. The transistor Q2, therefore, is turned off. The collector terminal of the transistor Q2 then pulls the voltage supplied to the gate terminal of the FET Q1 to $V_{neg}$ through R, thus forwarding $V_{neg}$ to Q1. In this example, Q2 is translating control signals from Q3 to Q1. As a result, current conducts from the source to the drain terminals of the FET Q1. This conduction restores the connection of the low power bus between the USB host controller 20 and the USB interface 18.

In one embodiment, the types, values or voltages are used as shown in Table 1 below:

TABLE 1

| Element | Type, Value or Range |
| --- | --- |
| Q1 | IRF5803 |
| Q2 | MMBT3906WT1 |
| Q3 | MMBT3904WT1 |
| R1 | 30 KΩ |
| R2 | 22 KΩ |

TABLE 1-continued

| Element | Type, Value or Range |
| --- | --- |
| R3 | 22 KΩ |
| R4 | 4.7 KΩ |
| R5 | 2.2 KΩ |

The disclosed protection device can be integrated into the interface, such as USB interface 18 and/or host controller 20. Additionally, the protection device can be a separate device connected at any point along the low level signal lines, but preferably the device is connected close to the computing device to reduce the likelihood that a short circuit to a high power source will occur between the protection device and the computing equipment. In one embodiment, the device is packaged in a water impervious housing. Additionally, the protection device can be integrated into the computing equipment. The described embodiment requires a separate circuit for each signal line. Therefore, there may be a plurality of protection circuits based on the number of signal lines. However, the circuit can be easily adapted such that multiple signal lines are protected with a single circuit.

INDUSTRIAL APPLICABILITY

The industrial applicability of the circuit for over voltage protection for low level electrical signal interfaces described herein will be readily appreciated from the foregoing discussion. The present disclosure is applicable to many machines and many computing systems, sensors and interfaces distributed throughout a machine. One exemplary machine suited to the disclosure is an excavator. Excavators are electro-hydraulic machines that often dig in soil. An excavator may have camera equipment or radar attached to its arm. The camera equipment and/or radar can be connected to the operator compartment through low level electrical signals. A computer in the operator compartment can be protected from high short circuits between the low level signals and the machine's high power system. It should be reiterated that the foregoing discussion applies to many machines and computing interfaces.

It should be understood that many other machines contain conductors transmitting high voltage electrical signals in close proximity to conductors transmitting low level electrical signals. The present disclosure is also suitable for use in these environments. In the disclosed embodiment, the long term over voltage protection circuit protects connected devices from steady-state voltages up to 40 volts. However, the circuit can be adapted to protect connected devices from any over voltage condition.

The protection scheme described above can be adapted to wide range of electrical interfaces. Firewire, Ethernet and SCSI are additional examples of low level signals that could become shorted to a machines high power systems. Thus, any low level signal interface can benefit from the circuit and device described above.

It will be appreciated that the foregoing description provides examples of the disclosed circuit and device. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of values and ranges of values are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. An over-voltage protection circuit for limiting the electrical power supplied via a low-power serial data bus to a computing apparatus in a machine, the circuit comprising:
    a long term voltage protection circuit including
    a first switch including a field effect transistor, the field effect transistor including a source terminal, a drain terminal, and a gate terminal, the first switch connecting an external interface to the computing apparatus when the first switch is in a closed position; and
    a second switch, including
    a first bipolar junction transistor including a first collector terminal, a first emitter terminal, and a first base terminal, and
    a second bipolar junction transistor including a second collector terminal, a second emitter terminal, and a second base terminal; and
    configured to sense the voltage level developed at the external interface and provide a control signal to open the first switch if the voltage at the external interface exceeds a predetermined threshold voltage to remove power from the low-power serial data bus and the computing apparatus, and
    wherein the gate terminal is connected to the first collector terminal, and the second base terminal is connected to the source terminal through a first resistor and the first emitter terminal is connected to a first reference voltage that approximates the predetermined threshold voltage.

2. The circuit of claim 1 wherein the external interface includes the long term over voltage protection circuit integrated into a pluggable connection.

3. The circuit of claim 2 wherein the long term over voltage protection circuit is packaged in a substantially water impervious environment.

4. The circuit of claim 1, further including a transient over voltage protection circuit disposed to sense a transient voltage that exceeds a threshold voltage and to limit the electrical power when the threshold voltage is exceeded.

5. The circuit of claim 1, wherein the second collector terminal is connected to the first reference voltage through a second resistor.

6. The circuit of claim 1, wherein the second collector terminal is connected to the first base terminal.

7. The circuit of claim 1, wherein the first collector terminal is connected to a second reference voltage through a third resistor.

8. The circuit of claim 7, wherein the second reference voltage is negative in relation to the voltage at the source terminal.

9. The circuit of claim 1, wherein the second emitter terminal is connected to a supply voltage through a fourth resistor.

10. The circuit of claim 1, wherein the supply voltage approximates five volts.

* * * * *